(12) United States Patent
Lee et al.

(10) Patent No.: US 11,294,828 B2
(45) Date of Patent: Apr. 5, 2022

(54) APPARATUS AND METHOD FOR CONTROLLING ALLOCATION OF INFORMATION INTO A CACHE STORAGE

(71) Applicant: Arm Limited, Cambridge (GB)

(72) Inventors: Jaekyu Lee, Austin, TX (US); Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 141 days.

(21) Appl. No.: 16/412,674

(22) Filed: May 15, 2019

(65) Prior Publication Data
US 2020/0364154 A1 Nov. 19, 2020

(51) Int. Cl.
G06F 12/12 (2016.01)
G06F 9/38 (2018.01)
G06F 12/0862 (2016.01)

(52) U.S. Cl.
CPC ............ *G06F 12/12* (2013.01); *G06F 9/3842* (2013.01); *G06F 12/0862* (2013.01); *G06F 2212/608* (2013.01)

(58) Field of Classification Search
CPC .. G06F 12/0897; G06F 12/0811; G06F 12/12; G06F 12/08; G06F 9/384; G06F 9/3842; G06F 2212/608
See application file for complete search history.

(56) References Cited

U.S. PATENT DOCUMENTS 6,418,513 B1 * 7/2002 Arimilli .............. G06F 12/0897
  711/117
6,532,521 B1 * 3/2003 Arimilli .............. G06F 9/30047
  711/122

(Continued)

OTHER PUBLICATIONS

PoisonIvy: Safe Speculation for Secure Memory by Lehman (Year: 2016).*
Conditional Speculation: An Effective Approach to Safeguard Out-of-Order Execution Against Spectre Attacks by Li (Year: 2019).*
InvisiSpec: Making Speculative Execution Invisible in the Cache Hierarchy by Yan (Year: 2018).*

(Continued)

*Primary Examiner* — Paul M Knight
(74) *Attorney, Agent, or Firm* — Nixon & Vanderhye P.C.

(57) ABSTRACT

An apparatus and method are provided for controlling allocation of information into a cache storage. The apparatus has processing circuitry for executing instructions, and for allowing speculative execution of one or more of those instructions. A cache storage is also provided having a plurality of entries to store information for reference by the processing circuitry, and cache control circuitry is used to control the cache storage, the cache control circuitry comprising a speculative allocation tracker having a plurality of tracking entries. The cache control circuitry is responsive to a speculative request associated with the speculative execution, requiring identified information to be allocated into a given entry of the cache storage, to allocate a tracking entry in the speculative allocation tracker for the speculative request before allowing the identified information to be allocated into the given entry of the cache storage. The allocated tracking entry is employed to maintain restore information sufficient to enable the given entry to be restored to an original state that existed prior to the identified information being allocated into the given entry. The cache control circuitry is further responsive to a mis-speculation condition being detected in respect of the speculative request, to employ the restore information maintained in the allocated tracking entry for that speculative request in order to restore the given entry in the cache storage to the original state. Such an approach can provide robust protection against speculation-based cache timing side-channel attacks whilst alleviating the performance and/or power consumption issues associated with known techniques.

23 Claims, 13 Drawing Sheets

(56) References Cited

U.S. PATENT DOCUMENTS

| | | | | |
|---|---|---|---|---|
| 2003/0154345 | A1* | 8/2003 | Lyon | G06F 12/0864 |
| | | | | 711/122 |
| 2013/0290637 | A1* | 10/2013 | Turean | G06F 12/1458 |
| | | | | 711/122 |
| 2014/0143613 | A1* | 5/2014 | Cargnoni | G06F 11/1048 |
| | | | | 714/48 |
| 2014/0156941 | A1* | 6/2014 | Loh | G06F 12/0846 |
| | | | | 711/133 |
| 2018/0300258 | A1* | 10/2018 | Wokhlu | G06F 12/0862 |
| 2019/0079866 | A1* | 3/2019 | Weiss | G06F 12/0897 |
| 2019/0114422 | A1 | 4/2019 | Johnson et al. | |
| 2019/0138720 | A1* | 5/2019 | Grewal | G06F 9/3863 |
| 2019/0332379 | A1* | 10/2019 | Calhoun | G06F 9/3802 |

OTHER PUBLICATIONS

Improving Direct-Mapped Cache Performance by the Addition of a Small Fully-Associative Cache and Prefetch Buffers by Jouppi (Year: 1990).*

International Search Report and Written Opinion of the International Searching Authority for PCT/GB2020/050731 dated May 13, 2020, 16 pages.

T.S. Lehman et al, "PoisonIvy: Safe Speculation for Secure Memory" *Microarchitecture*, IEEE, Oct. 15, 2016, 13 pages.

H. Chen et al, "From Speculation to Security: Practical and Efficient Information Flow Tracking Using Speculative Hardware" *International Symposium on Computer Architecture*, Jun. 21, 2008, pp. 401-412.

* cited by examiner

| Line Origin | Inclusive | | | Exclusive | | |
|---|---|---|---|---|---|---|
| | L1 | L2 | L3 | L1 | L2 | L3 |
| L2 | ⊠ | | | ⊠ | ↵ | |
| L3 | ⊠ | ⊠ | | ⊠ | | ↵ |
| Memory | ⊠ | ⊠ | ⊠ | ⊠ | | |
| ⊠: invalidate and restore, ↵: write back | | | | | | |

APPARATUS AND METHOD FOR CONTROLLING ALLOCATION OF INFORMATION INTO A CACHE STORAGE

BACKGROUND

The present disclosure relates to a technique for controlling allocation of information into a cache storage.

A data processing apparatus may support speculative execution of instructions, in which instructions are speculatively executed before it is known whether the instructions in fact need to be executed. For example, a processing apparatus may have a branch predictor for predicting outcomes of branch instructions so that subsequent instructions can be fetched, decoded and executed speculatively before it is known what the real outcome of the branch should be. If the prediction is correct then performance is saved because the subsequent instructions can be executed sooner than if they were only fetched once the outcome of the branch is actually known.

It has been identified that in certain instances allocation of information into a cache storage based on speculative execution of instructions can open up a source of attack to seek to identify sensitive data. For example, information has been published about speculation-based cache timing side-channel attacks, where a number of techniques can be used so that cache timing analysis can be abused to leak information out of mis-speculated execution of instructions.

Such attacks can be used to first maliciously train branch predictors so that they can redirect control flow to a section of code ("wrong path") that should not have been reached under the correct execution of the instruction stream. Then, instructions that are within such a wrong path can be executed due to the ability to support out-of-order execution. As a result, secret data can be read from and written into a cache during such wrong path execution, and later an attacker may seek to extract secrets from the cache through timing attack analysis.

SUMMARY

In one example arrangement, there is provided an apparatus comprising: processing circuitry to execute instructions, the processing circuitry being arranged to allow speculative execution of one or more of the instructions; a cache storage comprising a plurality of entries to store information for reference by the processing circuitry; and cache control circuitry to control use of the cache storage, the cache control circuitry comprising a speculative allocation tracker having a plurality of tracking entries; wherein: the cache control circuitry is responsive to a speculative request associated with the speculative execution, requiring identified information to be allocated into a given entry of the cache storage, to allocate a tracking entry in the speculative allocation tracker for the speculative request before allowing the identified information to be allocated into the given entry of the cache storage, and to employ the allocated tracking entry to maintain restore information sufficient to enable the given entry to be restored to an original state that existed prior to the identified information being allocated into the given entry; and the cache control circuitry is further responsive to a mis-speculation condition being detected in respect of the speculative request, to employ the restore information maintained in the allocated tracking entry for that speculative request in order to restore the given entry in the cache storage to the original state.

In another example arrangement, there is provided a method of controlling allocation of information into a cache storage, comprising: providing processing circuitry to execute instructions, the processing circuitry being arranged to allow speculative execution of one or more of the instructions; arranging the cache storage to provide a plurality of entries to store information for reference by the processing circuitry; providing a speculative allocation tracker having a plurality of tracking entries; in responsive to a speculative request associated with the speculative execution, that requires identified information to be allocated into a given entry of the cache storage, allocating a tracking entry in the speculative allocation tracker for the speculative request before allowing the identified information to be allocated into the given entry of the cache storage; employing the allocated tracking entry to maintain restore information sufficient to enable the given entry to be restored to an original state that existed prior to the identified information being allocated into the given entry; and responsive to a mis-speculation condition being detected in respect of the speculative request, employing the restore information maintained in the allocated tracking entry for that speculative request to restore the given entry in the cache storage to the original state.

In a still further example arrangement, there is provided an apparatus comprising: processing means for executing instructions, the processing means for allowing speculative execution of one or more of the instructions; cache storage means for providing a plurality of entries to store information for reference by the processing means; and cache control means for controlling use of the cache storage means, the cache control means comprising speculative allocation tracker means for providing a plurality of tracking entries; wherein: the cache control means, responsive to a speculative request associated with the speculative execution, that requires identified information to be allocated into a given entry of the cache storage means, for allocating a tracking entry in the speculative allocation tracker means for the speculative request before allowing the identified information to be allocated into the given entry of the cache storage means, and for employing the allocated tracking entry to maintain restore information sufficient to enable the given entry to be restored to an original state that existed prior to the identified information being allocated into the given entry; and the cache control means, responsive to a mis-speculation condition being detected in respect of the speculative request, for employing the restore information maintained in the allocated tracking entry for that speculative request in order to restore the given entry in the cache storage means to the original state.

BRIEF DESCRIPTION OF THE DRAWINGS

The present technique will be described further, by way of illustration only, with reference to examples thereof as illustrated in the accompanying drawings, in which:

FIG. 8B is a table illustrating the result of applying the process of FIG. 8A for various example scenarios;

DESCRIPTION OF EXAMPLES

Figure 1:
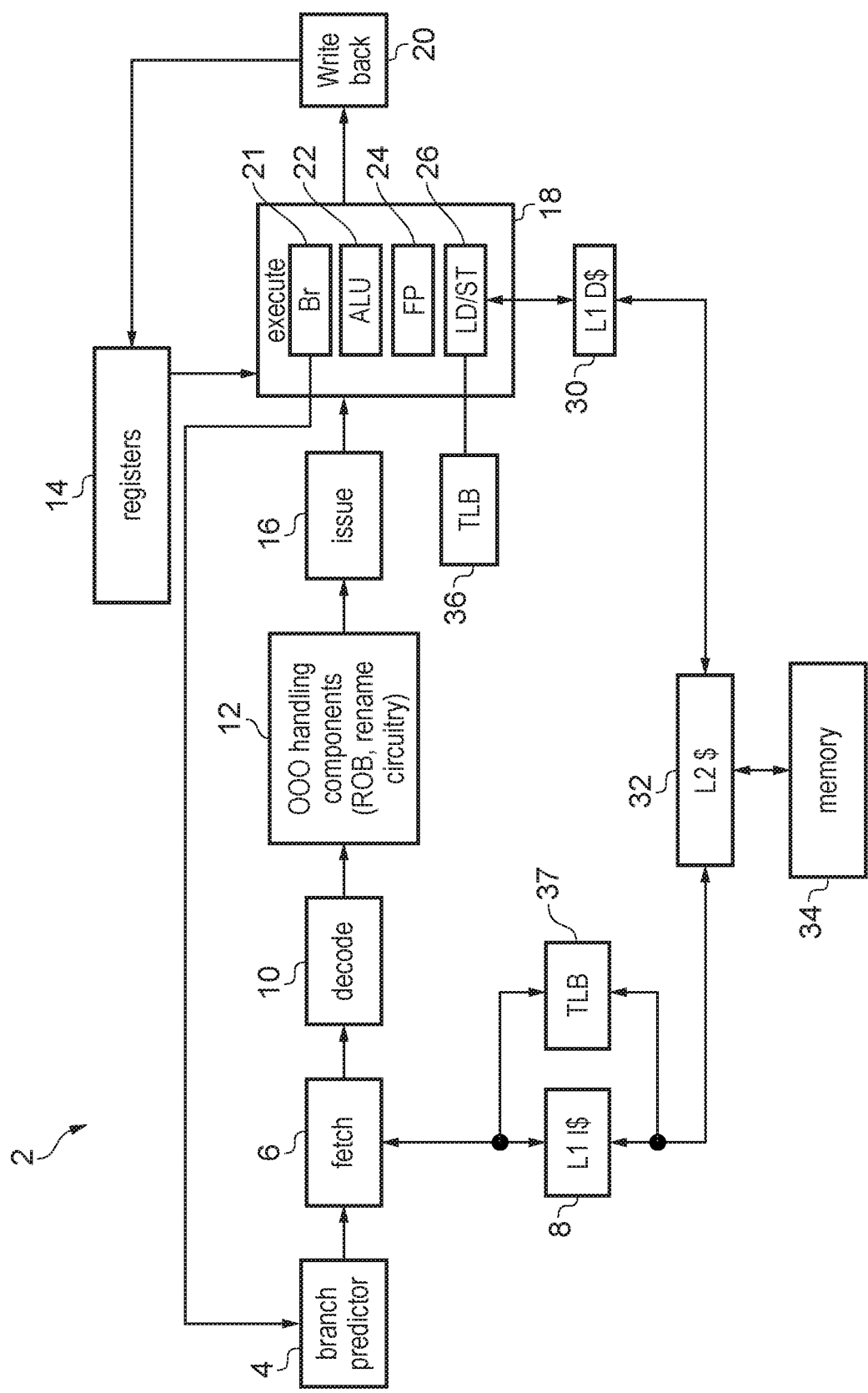
FIG. 1 schematically illustrates a data processing apparatus in accordance with one example.

There has recently been much interest in speculation-based cache timing side-channel attacks, where a number of techniques can be used so that cache timing analysis can then be abused to leak information out of mis-speculated execution of instructions. The basic principle behind cache timing side-channels is that the pattern of allocations into a cache, and in particular which cache sets have been used for allocation, can be determined by measuring the time taken to access entries that were previously in that cache, or by measuring the time to access the entries that have been allocated. This can then be used to determine which addresses have been allocated into the cache. The novelty of speculation-based cache timing side-channels is their use of speculative memory reads. Speculative memory reads are typical of advanced microprocessors, and part of the overall functionality which enables high performance.

By performing a first speculative memory read to a cacheable location beyond an architecturally unresolved branch (or other change in program flow), the result of that read can itself be used to form the addresses of further speculative memory reads. These speculative reads cause allocations of entries into the cache whose addresses are indicative of the values of the first speculative read. This can become an exploitable side-channel if untrusted code is able to control the speculation in such a way that it causes a first speculative read of a location which would not otherwise be accessible by that untrusted code. In particular, the effects of the second and subsequent speculative allocations into the cache can be measured by the untrusted code.

Whilst the various speculative read operations referred to above might all be in relation to data values, and hence may cause data to be allocated into a data cache, there is the potential to employ a similar technique in connection with other cache structures, such as an instruction cache, an address translation cache (often referred to as a translation lookaside buffer (TLB)), etc.

A number of schemes have been proposed for seeking to thwart such speculation-based cache timing side-channel attacks. For example, software patches may be used to serialize the instruction sequence such that all instructions are executed sequentially, and thus out-of-order execution is limited. However, the performance degradation can be very severe when using such an approach.

Another described scheme aims to implement better branch indexing. As discussed earlier, an initial step in such an attack is to manipulate the branch prediction circuitry so as to cause mispredictions, and such branch prediction structures are typically indexed, for example using a program counter and global history. By providing more complex indexing schemes, this can make such attacks more difficult. However, once the indexing scheme is known, the processor will again become vulnerable to such attacks.

A third identified scheme involves preventing microarchitectural changes such as updates to cache structures. Whilst this allows speculative and out-of-order execution, this prevents any speculative changes within the cache structures. Hence for example, instead of writing into a cache structure, data can be written into a separate speculation buffer and those changes can be made invisible until all older branches are resolved. However, it has been found that this approach can be too conservative, because the number of wrong control path cache fills is typically very small in real world applications due to increasingly accurate branch prediction mechanisms and improved cache microarchitecture. In order for a cache fill to occur that could potentially be used in such an attack, the cache access needs to be performed by speculatively executing instructions due to a mispredicted branch, and needs to result in a cache miss so that a fill occurs into the cache. However, branch prediction accuracy is usually very high, and also cache hit rate is typically very high. Consequently, employing a separate speculation buffer to hold such cache updates during speculative execution can have a significant impact on performance and power, since most cache lines will then need two writes, one into the speculation buffer and then another one into the cache.

The techniques described herein are aimed at increasing the resilience of a cache storage to speculation-based cache timing side-channel attacks, whilst alleviating the performance or power issues associated with the previously proposed techniques. In accordance with the techniques described herein, an apparatus is provided that has processing circuitry for executing instructions, where the processing circuitry allows speculative execution of one or more of those instructions. By way of example, the processing circuitry may support out-of-order execution, and hence once a prediction has been made with regard to a branch instruction, instructions can be fetched based on that prediction, and may be speculatively executed before it is known whether those instructions will in fact need to be executed, i.e. before it is known whether the prediction made in respect of the branch instruction was correct.

The apparatus also has cache storage that comprises a plurality of entries for storing information for reference by the processing circuitry. The cache storage can take a variety of forms, for example it could be a data cache, an instruction cache, a TLB, etc. Cache control circuitry is provided to control use of the cache storage, the cache control circuitry comprising a speculative allocation tracker having a plurality of tracking entries.

In response to a speculative request associated with the speculative execution, requiring identified information to be allocated into a given entry of the cache storage, the cache control circuitry is arranged to allocate a tracking entry in the speculative allocation tracker for the speculative request before allowing the identified information to be allocated into the given entry of the cache storage. Hence, before the given entry can be updated in the cache storage, it is first necessary for a tracking entry to be allocated. The cache control circuitry then employs the allocated tracking entry to maintain restore information sufficient to enable the given entry to be restored to an original state that existed prior to the identified information being allocated into the given entry.

Then, if a mis-speculation condition is detected in respect of the speculative request, the cache control circuitry is arranged to employ the restore information maintained in the allocated tracking entry for that speculative request in order to restore the given entry in the cache storage to the original state.

Hence, in accordance with the above described technique, micro-architectural updates are not inhibited when the processing circuitry is speculatively executing instructions, but instead a tracking entry is allocated in the speculative allocation tracker before the cache storage is updated, and is used to maintain sufficient information to enable the update to be reversed if in due course it turns out that there has been a mis-speculation, and accordingly the speculative request should not have been processed. Hence, such an approach alleviates the performance and power consumption issues associated with previously proposed techniques, but provides robust protection against the earlier-discussed speculation-based cache timing side-channel attacks, by enabling the cache storage to be restored to its original state in situations where a mis-speculation is detected. Since the cache storage is restored to its original state in such instances, any attempt to perform cache timing analysis will not enable secret data to be determined.

As mentioned above, it is necessary for a tracking entry to be allocated in the speculative allocation tracker before an update to a given entry of the cache storage can be performed based on a received speculative request. In one example implementation, in the absence of a tracking entry being available for allocation in association with the speculative request, the speculative request is stalled. It can then be retried at a later point, by which time there may be an available tracking entry, or by which time the data required by the speculative request may already reside within the cache and accordingly there may be no need for information to be allocated into the given entry of the cache storage in response to the speculative request. Indeed, by the time the request is retried, it may in fact no longer be speculative, and accordingly the above described mechanism may not need to be employed.

In one example implementation, when allocation of the identified information into the given entry causes an eviction of existing information from the given entry, the restore information is arranged to comprise at least the existing information. Hence, that existing information is captured in association with the allocated tracking entry so that it is available in due course if it is necessary to restore the given entry to its original state.

In one example implementation, once the given entry has been restored to the original state in response to the mis-speculation condition, the cache control circuitry is arranged to deallocate the allocated tracking entry. This frees up the tracking entry to be allocated in association with a subsequent speculative request.

In some implementations, a number of steps may be required to be performed in order to implement a restore operation to restore the given entry to the original state. Indeed, the number of steps required may be dependent on the restore information itself. By way of specific example, if the allocation of the identified information into the given entry did not cause an eviction of valid existing information, there will be no need to restore existing information into the given entry, and it may be sufficient merely to invalidate the given entry when performing the restore operation. In such implementations, the allocated tracking entry may be provided with a restore status field to track performance of the steps required to implement the restore operation, so that it can be determined when all of the required steps have been performed.

The cache storage can be arranged in a variety of ways within the apparatus. In one example implementation, the cache storage is at a given level in a memory hierarchy, the speculative request requires issuing to a lower level of the memory hierarchy in order to obtain the identified information, and the cache control circuitry is arranged to prevent issuance of the speculative request to the lower level of the memory hierarchy until a tracking entry has been allocated in the speculative allocation tracker for the speculative request. Hence, the way in which the allocation of the identified information into the given entry is prevented, if a tracking entry is not available to be allocated to the speculative request, is by preventing the speculative request from being propagated on to the lower level of the memory hierarchy. It will be appreciated that until the speculative request has been propagated on, there is no prospect of receiving the identified information that then needs to be allocated into the given entry.

In one such example arrangement, when the mis-speculation condition is detected before the identified information has been obtained, the cache control circuitry is arranged to prevent the identified information being written into the given entry to thereby preserve the original state of the given entry. Hence, assuming a tracking entry is allocated and accordingly the speculative request is issued to the lower level of the memory hierarchy, but then before the identified information becomes available from the lower level of the memory hierarchy for writing into the given entry of the cache storage the mis-speculation condition is detected, the cache control circuitry can be arranged to merely prevent that identified information being written into the given entry. By such an approach, the original state is maintained.

There are a number of ways in which the cache control circuitry can prevent the identified information being written into the given entry in such circumstances. In one example arrangement, the cache control circuitry comprises a fill buffer to temporarily store information received from the lower level of the memory hierarchy before storing that information in the cache storage. Then, when the mis-speculation condition is detected before the identified information has been obtained, the cache control circuitry is arranged to prevent the identified information being written into the given entry by notifying the fill buffer to discard the identified information when received from the lower level of the memory hierarchy.

In implementations where the cache control circuitry can prevent the identified information being written into the given entry when the mis-speculation condition is detected before the identified information has been obtained, then the cache control circuitry may be arranged to de-allocate the allocated tracking entry once writing of the identified information into the given entry has been prevented. The exact timing of de-allocation of the allocated tracking entry may vary dependent on implementation. For example, considering the fill buffer implementation discussed earlier, then as soon as the fill buffer has been notified that it should prevent the identified information being written into the given entry, it may be possible at that time to de-allocate the allocated tracking entry. However, in an alternative implementation, the cache control circuitry may wait until confirmation is received from the fill buffer that the writing of the identified information into the given entry has been prevented, before de-allocating the allocated tracking entry.

In one example implementation the cache control circuitry may comprise an eviction buffer into which information evicted from entries of the cache storage is temporarily stored. When allocation of the identified information into the given entry causes an eviction of the existing information from the given entry, the existing information may then be captured in a given buffer entry of the eviction buffer, and the speculative allocation tracker may be arranged to maintain the restore information with reference to the given buffer entry. Whilst the contents from the given buffer entry could be copied across into the allocated tracking entry, in some implementations this is not required, and instead the allocated tracking entry can be linked to the given buffer entry so that the existing information can be retrieved from the given buffer entry in due course if needed. In one particular example implementation, the given buffer entry forms part of the allocated tracking entry.

In one example implementation, responsive to a correct speculation condition being detected in respect of the speculative request, the cache control circuitry is arranged to deallocate the allocated tracking entry. Hence, as soon as it is known that the speculative request is in fact needed, and hence is no longer speculative, the allocated tracking entry can merely be deallocated as the content maintained by that allocated tracking entry is no longer needed. This can free up tracking entries for allocation to other speculative requests.

The allocated tracking entry can take a variety of forms, but in one example implementation has a fill complete field which is set to identify when the identified information has been stored in the given entry of the cache storage. This can be used for example to identify situations where the information has not yet been written into the given entry, and hence where in the presence of the mis-speculation condition it will be sufficient to prevent the identified information from being written into the given entry, for example by notifying the fill buffer discussed earlier. However, once the fill complete field has been set, it is known that it will at least be necessary to invalidate the given entry, and indeed may also be necessary to restore the previous existing information into that given entry if valid existing information was evicted during the fill process.

There are a number of ways in which it can be determined whether it is necessary to restore existing information into the given entry during the restore process. However, in one example implementation, the allocated tracking entry may have an evict valid field which is set to identify when allocation of the identified information into the given entry causes an eviction of existing information from the given entry. Hence, if the evict valid field is not set, but the fill complete field is set, it may be determined that the action required to restore the given entry to the original state is to invalidate the current contents of the given entry. However, if the evict valid field is also set, then it may also be necessary to write the existing information back into the given entry in order to restore the given entry to its original state.

In one example implementation, the cache storage is at a given level in a memory hierarchy and the apparatus further comprises at least one additional cache storage at a different level in the memory hierarchy. A further speculative allocation tracker can then be provided for each additional cache storage. In such an implementation, in response to the mis-speculation condition being detected in respect of the speculative request, the further speculative allocation tracker associated with each additional cache storage that has had an entry updated due to the speculative request can be arranged to perform a restore operation in order to restore that entry to its original state. In particular, it may be the case that during the process of obtaining the identified information for writing into the given entry of the cache storage, entries in one or more of the other cache storages may also have been updated, and accordingly by such an approach it can be ensured that each of the caches is restored to its original state in the event of the mis-speculation.

To assist in this process, the allocated tracking entry may have an origin field to identify the level within the memory hierarchy from which the identified information was obtained. Then, the origin information may be used to determine which further speculative allocation trackers are required to perform the restore operation. The determination performed here may depend on a variety of factors. For example, it may depend on whether the cache storage and the at least one additional cache storage operate in an inclusive arrangement or an exclusive arrangement. In accordance with an inclusive arrangement, any information held in a cache at a higher level in the memory hierarchy will also be stored in a cache at a lower level of the memory hierarchy. However, in accordance with an exclusive arrangement, any particular piece of information will only be stored in one of the caches.

When the caches operate in an inclusive arrangement then the origin information may be used to determine which level in the cache hierarchy the restore request needs to be propagated to, and this can avoid the need to propagate the request to a cache level that is beyond the origin level, only to find out that that cache level does not need to perform any restore operation. When the caches operate in an exclusive arrangement, if the identified information has been provided by a lower level of cache, it will have been evicted from that lower level of cache due to the need for the caches to operate in the exclusive arrangement. Hence, when the given entry in the higher level cache is restored to its original state, causing the identified information to be evicted, that identified information can then be provided back to the origin level of the cache, so that that evicted information can be restored into the origin level of the cache to restore the origin level of cache to its original state.

As mentioned earlier, the cache storage can take a variety of forms. In one example arrangement, the cache storage is a data cache, and the information comprises data values processed by the processing circuitry when executing the instructions. In such an implementation, the speculative request may result from speculative execution of a memory access instruction that gives rise to a miss being detected in the cache storage. The memory access instruction could for example be a load instruction seeking to load data from the cache into a working register of the processor, or indeed could be a store instruction seeking to write data from such a working register back into the cache. When performing a store operation, this can still give rise to the need to retrieve information from a lower level of the cache hierarchy for writing into the given entry of the cache storage, at which point that retrieved data will typically be merged with the write data to produce the updated information stored into the given entry. Hence, it is not only in association with load operations, but also store operations, that there is a vulnerability to the earlier-discussed speculation-based cache timing side-channel attacks, and the techniques described herein can be used for both load and store instructions in order to prevent such attacks.

In one such implementation where the cache storage is a data cache, the apparatus may further comprise execution control circuitry to track progress of instructions being executed by the processing circuitry, and to flag the memory access instruction as being speculative whilst an older branch instruction is being tracked in the execution control circuitry as an unresolved branch. The execution control circuitry may then be arranged to detect the mis-speculation condition when branch resolution identifies that a misprediction was made for the older branch instruction, and to trigger performance of a restore operation by the cache control circuitry for the flagged memory access instruction. The execution control circuitry can take a variety of forms, but in one particular implementation may be a reorder buffer. Hence, the reorder buffer can be arranged to maintain a flag in association with memory access instructions to identify when those memory access instructions are speculative. Once an older branch instruction is resolved, and if it is determined that the prediction for the branch instruction is correct, then any younger memory access instruction that has been flagged can have the flag cleared, as it is known that it is no longer speculative.

There are a number of ways in which the execution control circuitry can trigger performance of the restore operation when the mis-speculation condition is detected. In one example implementation, this is achieved by issuing instruction identifier information to the cache control circuitry to identify each flagged memory access instruction younger than the older branch instruction. In particular, these are the memory access instructions that should not have been executed, now it is known that the prediction made in respect of the older branch is wrong. Each tracking entry may then include an instruction identifier field, and the cache control circuitry can cause a lookup to be performed in the speculative allocation tracker using the instruction identifier information received from the execution control circuitry in order to identify each entry in the cache storage that needs to be restored to its original state.

The instruction identifier information provided by the execution control circuitry can take a variety of forms. For example, a separate instruction identifier may be issued for each flagged memory access instruction that is younger than the older branch instruction. Alternatively, some form of range information may be specified in order to identify all of the relevant memory access instructions, and the cache control circuitry can then recreate the required instruction identifiers in order to enable the necessary lookups to be performed within the speculative allocation tracker to identify the relevant tracking entries, and hence identify the entries in the cache storage that need to be restored to the original state.

In some instances, there may be a concern that the inability to progress a speculative request until a tracking entry in the speculative allocation tracker can be allocated could give rise to a deadlock situation arising, preventing forward progress by the processing circuitry. In situations where there is such a concern, then each tracking entry may be supplemented to include a timestamp field that is set to a timestamp value when that tracking entry is allocated, and which is referenced to determine elapse of a time period after which the allocated tracking entry is to be deallocated to prevent a deadlock condition. In particular, the time period can be chosen to be a time period that is larger than the maximum expected time for which an allocated tracking entry will be needed. In particular, speculation is an inherently transient activity, and any speculation should be resolved within a relatively short period. Hence, if an allocated tracking entry is still present after a relatively large time period has expired, this may indicate a situation where an allocated tracking entry has not been cleared as expected, and accordingly it may be appropriate to deallocate the allocated tracking entry. This can then ensure that a deadlock condition does not arise where all of the tracking entries within the speculative allocation tracker are allocated, and hence one or more speculative requests are being stalled.

As mentioned earlier, the cache storage can take a variety of forms, and the techniques described herein can be applied equally to such other types of cache storage. For example, the cache storage may be an instruction cache, and the information may comprise instructions fetched from memory for execution by the processing circuitry. As another example, the cache storage may comprise an address translation cache, and the information may comprise address translation data used by the processing circuitry when converting a virtual address into a corresponding physical address of a memory system.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. Out-of-order handling components 12 are provided at a next stage to handle out-of-order execution of instructions. These components can take a variety of forms, including for example a reorder buffer (ROB) (also referred to herein as execution control circuitry) and rename circuitry. The ROB is used to keep track of the progress of the instructions and ensure that the instructions are committed in order, even though they are executed out-of-order. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A write back stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Such an apparatus as shown in FIG. 1 can be used to perform speculative execution of instructions. Speculative execution of instructions by the processing circuitry before it is actually known whether the inputs to those instructions are correct or whether those instructions needed to be executed at all, can be extremely beneficial in providing high processor performance. However, it has recently been recognised that if such speculation leads to memory accesses being performed speculatively, allocations into a cache triggered by the speculative memory accesses may remain visible even after a speculative instruction has been resolved as mispredicted or incorrectly speculated and the architectural effects of the speculative re-executed instructions have been reversed. This can then allow subsequently executed code to investigate what data was loaded by earlier code by using cache timing side-channels. The basic principle behind cache timing side-channels is that the pattern of allocations into a cache, and, in particular, which cache sets have been used for the allocation, can be determined by measuring the time taken to access entries that were previously in that cache, or by measuring the time to access the entries that have been allocated. This then can be used to determine which addresses have been allocated into that cache.

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1    struct array {
2        unsigned long length;
3        unsigned char data[ ];
4    };
5    struct array *arr = ...;
6    unsigned long untrusted_offset_from_user = ...;
7    if (untrusted_offset_from_user < arr->length) {
8        unsigned char value;
9        value =arr->data[untrusted_offset_from_user];
10       ...
11   }
```

In a modern microprocessor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1    struct array {
2        unsigned long length;
3        unsigned char data[ ];
4    };
5    struct array *arr1 = ...; /* small array */
6    struct array *arr2 = ...; /*array of size 0x400 */
7    unsigned long untrusted_offset_from_user = ...;
8    if (untrusted_offset_from_user < arr1->length) {
9        unsigned char value;
10       value =arr1->data[untrusted_offset_from_user];
11       unsigned long index2 =((value&1)*0x100)+0x200;
12       if (index2 < arr2->length) {
13           unsigned char value2 = arr2->data[index2];
14       }
15   }
```

In this example, "value", which is loaded from memory using an address calculated from arr1->data combined with the untrusted_offset_from_user (line 10), is then used as the basis of a further memory access (line 13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel. By applying this approach to different bits of value, (in a number of speculative executions) the entirety of the data of value can be determined. Hence, the untrusted software can, by providing out-of-range quantities for untrusted_offset_from_user, access anywhere accessible to the supervisory software, and as such, this approach can be used by untrusted software to recover the value of any memory accessible by the supervisory software.

Modern processors have multiple different types of caching, including instruction caches, data caches, TLBs, etc. Where the allocation of entries in these caches is determined by the value of any part of some data that has been loaded based on untrusted input, then in principle this side channel could be stimulated. Whilst the example given above considered further speculation in the form of additional data load operations at addresses derived from the sensitive data ("value") obtained by the first speculative data load operation, the technique could also be applied to other cache structures.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

Hence, it is desirable to provide counter-measures against this type of attack.

Figure 2:
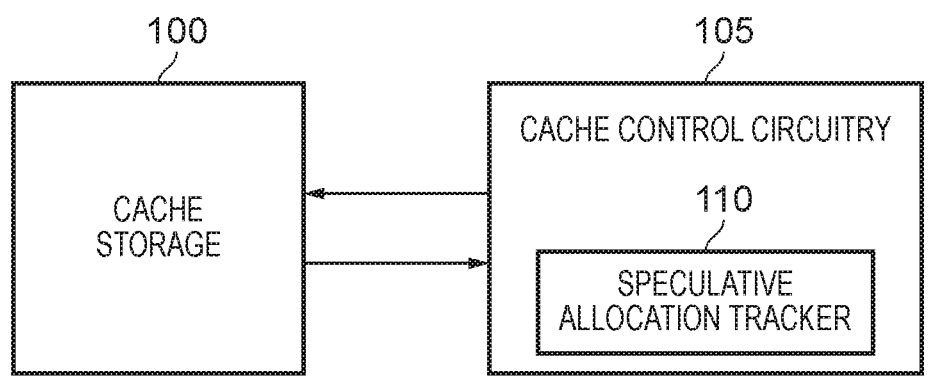
FIG. 2 illustrates the provision of a speculative allocation tracker within cache control circuitry associated with a cache, in accordance with one example implementation.

As illustrated in FIG. 2, in accordance with the techniques described herein the cache control circuitry 105 associated with a cache storage 100 is supplemented to include a speculative allocation tracker 110, also referred to herein as a speculative line tracker (SLT), each entry in the cache storage also being referred to as a cache line. The cache storage can take a variety of forms, for example a data cache such as the level one data cache 30, an instruction cache such as the level one instruction cache 8, or a TLB such as the TLBs 36, 37 illustrated in FIG. 1. However, for the purposes of the following discussion, it will assumed that the cache storage 100 is a data cache storing data values for access by the processing circuitry when executing instructions.

Figure 3:
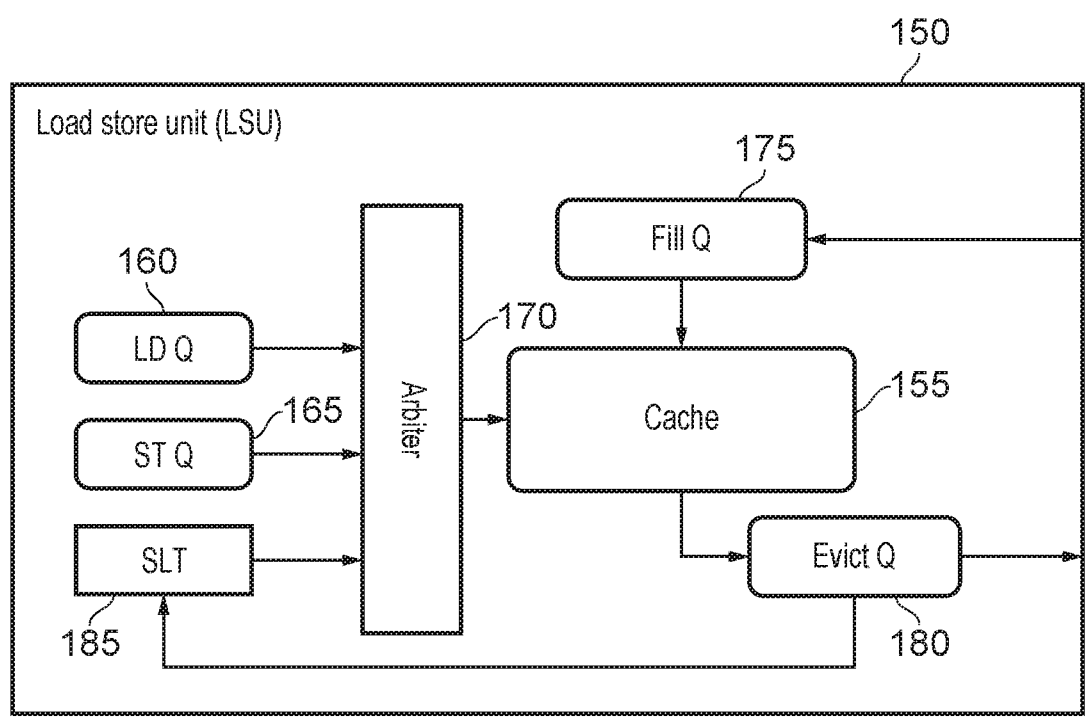
FIG. 3 illustrates components that may be provided within the load/store unit of a data processing apparatus, in accordance with one example arrangement.

In association with a level one data cache, the cache control circuitry can be incorporated within the functionality of the load store unit 26 (also referred to herein as an LSU). FIG. 3 shows an example LSU 150, and in this illustration the associated data cache is shown as being part of the LSU 150, as denoted by the box 155. The LSU may have one or more load queues 160 and store queues 165 for storing pending load and store operations, respectively. An arbiter 170 can be used to arbitrate between the various load and store operations, in order to determine the order in which those load and store operations are processed in respect of the cache 155.

Where the processing of such a load or store operation causes a miss to be detected within the cache 155, then a fill operation may be performed, resulting in the issuance of a fill request to a lower level in the memory hierarchy, such as the level two cache 32 shown in FIG. 1. This results in the retrieval of a cache line's worth of data from the lower levels of the memory hierarchy, which is then temporarily stored within the fill queue 175. Line fills are then performed within the relevant lines of the cache 155 using the data stored in the fill queue 175. Where allocation of data into a selected cache line results in valid data being evicted from the cache, then that valid evicted data may be stored within the evict queue 180 shown in FIG. 3. For example, in situations where the evicted data is valid and dirty, meaning that that data is more up-to-date than a version of the data held in the lower levels of the memory hierarchy, then the data can be stored within the evict queue, for issuing to a lower level of the memory hierarchy.

As also shown in FIG. 3, an SLT 185 may be provided, the SLT having a plurality of tracking entries. When speculatively performing a memory access operation (either a load or a store operation), in a situation where a cache miss is detected within the cache 155, then prior to issuing a speculative fill request to a lower level of the memory hierarchy, the LSU 150 is first arranged to allocate a tracking entry within the SLT 185 for that speculative fill request/associated speculative memory access operation. Once a tracking entry has been allocated, the speculative fill request can be issued to a lower level of the memory hierarchy. However, if there is no available tracking entry within the SLT to be allocated at that point in time, then the speculative access operation is stalled, and the speculative fill request is not issued at that time to the lower level of the memory hierarchy. The speculative access operation can then be retried later.

Figure 4A:
FIGS. 4A and 4B illustrate the format of tracking entries that may be provided within the speculative allocation tracker in accordance with one example arrangement.

As shown in FIG. 4A, the SLT 185 comprises a plurality of tracking entries 200. The number of entries provided is a matter of design choice. By providing more entries, this can reduce the chance that a speculative access operation needs to be stalled, and thereby improve performance. However, the more entries that are provided, the greater the size of the SLT 185, which increases the hardware overhead of the LSU 150.

Figure 4B:
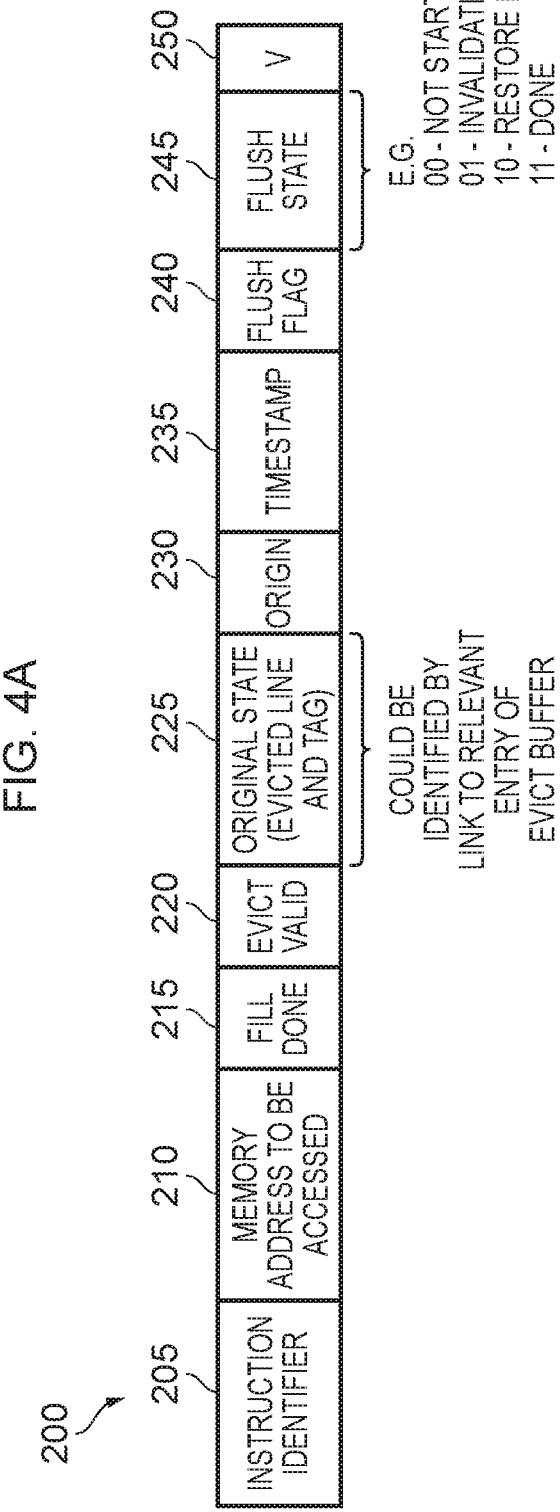

FIG. 4B schematically illustrates various fields that may be provided within each tracking entry 200. The basic aim of the allocated tracking entry is to maintain restore information sufficient to enable the allocated entry in the cache 155 that is used to store the fill data obtained by the speculative fill request to be restored to an original state that existed prior to that fill data being allocated as a result of performance of the speculative fill request.

As shown in FIG. 4B, an instruction identifier field 205 can be used to identify the memory access instruction that is associated with the tracking entry 200, thus identifying the speculative fill request to which the tracking entry relates. The instruction identifier should be sufficient to uniquely identify the instruction from amongst the instructions that are in the process of being executed by the data processing apparatus 2. In one example implementation, an instruction identifier as used by the reorder buffer in the out-of-order handling components 12 can be used for this purpose.

The field 210 is used to identify the memory address being accessed by the memory access instruction. In one example implementation, this field is used to store the physical address in memory for the data that is being accessed.

A fill done field 215 (also referred to herein as a fill complete field) is used to identify when the data being accessed by the speculative memory access instruction has been obtained and has been stored into the allocated cache line, hence identifying when the allocated cache line has been updated by the speculative fill request. Further, an evict valid field 220 can be used to identify when the storing of that retrieved data into the allocated cache line has resulted in valid data being evicted from the cache. In one example implementation, each of the fields 215, 220 may be a single bit field, with one logic value indicating a set state and the other logic value indicating a clear state. The information maintained within the fill done field 215 and evict valid field 220 can be used by the cache control circuitry, in this case the LSU 150, to determine the restore operation required in order to restore the allocated cache line to its original state in the event of a mis-speculation being determined in respect of the memory access instruction.

The field 225 can be used to store original state information for the allocated cache line. Hence, this field can be used to store both the cache line's worth of data evicted from the allocated cache line, and the tag value associated with that evicted data, the tag value being used to identify the memory address to which the evicted data relates. The information within the field 225 could be stored directly within the tracking entry 200, or instead a link could be provided to the relevant entry within the evict queue 180, also referred to herein as an evict buffer. In one particular implementation, that relevant entry in the evict buffer can be viewed as being part of the tracking entry 200.

An origin field 230 can be used to identify the origin of the data obtained by the speculative fill request. Hence, this can identify a lower level of the cache hierarchy from which the data has been accessed, or may identify that the data has been obtained from main memory 34. This origin information can be used to influence the restore operations required in respect of lower levels of the cache hierarchy in the presence of the mis-speculation condition, as will be discussed later with reference to FIGS. 8A and 8B.

A time stamp field 235 can be used to store a time stamp value indicative of the time the tracking entry is allocated, and as will be discussed later with reference to FIG. 11 this time stamp value can be used as part of a deadlock avoidance scheme.

A flush field 240 can be used to hold a flush flag which can be set if it is determined that a flush is required in respect of the allocated cache line used to store the data for the memory access instruction. Hence, in the event that a mis-speculation condition is detected for the instruction identified by the instruction identifier information in the field 205, then the flush flag 240 can be set to identify that the associated cache line in the cache 155 needs to restored to its original state.

Depending on the steps that are required to restore the original contents, then it may be that multiple steps need to be performed, and the flush state field 245 can be used to keep track of those various steps, so that it can be determined when the restore operation has been completed. For example, in some instances it may be necessary merely to invalidate the relevant cache line, whereas in other instances there may be valid evicted data which needs to be restored back into that cache line. Hence, as shown in FIG. 4B, a two bit field can be used to capture the relevant flush state in such instances, and in particular to distinguish between when the flush operation has not yet started, when the invalidation request has been issued, when the restore request has been issued, and when the process is complete.

Finally, as shown in FIG. 4B, a valid flag 250 can be used to identify whether the contents of the tracking entry are valid or not. When seeking to allocate a tracking entry for a new speculative fill request, it is necessary to find a tracking entry whose valid bit is cleared, identifying that that tracking entry is available for allocation.

Figure 5:
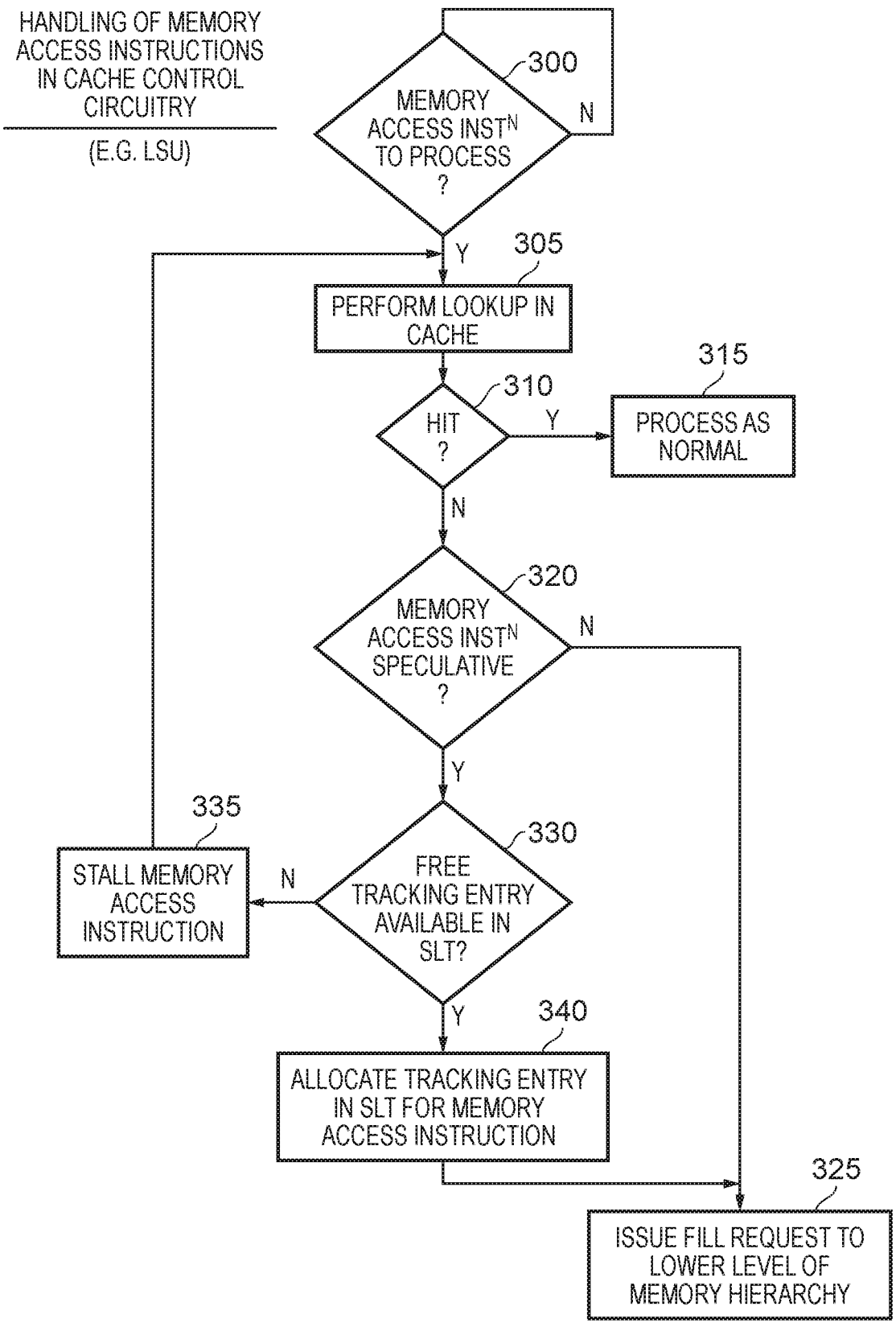
FIG. 5 is a flow diagram illustrating steps that may be performed by the cache control circuitry when processing memory access instructions, in accordance with one example implementation.

FIG. 5 is a flow diagram illustrating the operation of the cache control circuitry, for example the LSU 150, when processing memory access instructions. At step 300 it is determined whether there is a memory access instruction to process. This step may for example be performed by the arbiter 170 with reference to the contents of the load and store queues 160, 165. On selecting a memory access instruction to process, then at step 305 a lookup is performed within the cache 155, in one example this being performed using the physical address associated with the data being accessed. In one particular implementation, the cache 155 is a set associative cache, and accordingly an index portion of the address is used to identify a particular set within the cache, and thereafter a tag portion of the address is compared with the tag values stored in association with the various cache lines of the set in order to determine if there is an address match, i.e. whether there is a hit in the cache or not. If a hit is detected at step 310, then the process proceeds to step 315, where the memory access operation is processed as normal. Hence, for a load operation, this will cause the requested data to be returned directly to the processor using the contents of the cache. For a store operation, this will typically involve the write data specified by the store operation being merged with the contents of the hit cache line in order to produce an updated cache line.

If a hit is not detected within the cache, then the process proceeds to step 320 where it is determined whether the memory access instruction that is currently being processed is a speculative memory access instruction. This will typically be identified by the reorder buffer in the out-of-order handling components 12, and result in a speculative flag being associated with the memory access instruction when it is placed within the load or store queues 160, 165. If the memory access instruction is not speculative, then the process proceeds to step 325 where a fill request is issued to a lower level of the memory hierarchy.

However, if the memory access instruction is speculative, then in accordance with the techniques described herein it is first necessary to obtain a tracking entry in the SLT 185 before allowing the fill request to be propagated to the lower level of the memory hierarchy. Accordingly, at step 330 it is determined if there is a free tracking entry available in the SLT, i.e. whether there is a tracking entry whose valid flag 250 is currently clear. If so, then at step 340 a tracking entry is allocated in the SLT for the memory access instruction and thereafter the process proceeds to step 325 where the fill request is issued to the lower level of the memory hierarchy. From a review of FIG. 4B, it will be seen that when the tracking entry is first allocated, only a subset of the fields may be populated. For example, the instruction identifier field 205 can be used to identify the memory access instruction, and the address field 210 can be used to identify the physical memory address being accessed by that instruction. The time stamp field 235 can also be populated to identify a time stamp value indicative of the time of allocation of the tracking entry 200, and the valid field 250 can be set to identify that the tracking entry is valid. All of the remaining fields can initially be in a clear state, and will be updated over time as necessary in order to maintain sufficient information to enable the original state of the cache line allocated within the cache 155 to store the data obtained by the line fill request to be restored in the event that it is determined in due course that the speculative line fill request should not have been performed, i.e. there has been a mis-speculation condition.

If at step 330 there is no free tracking entry available in the SLT 185, then the process proceeds to step 335 where the memory access instruction is stalled. At this point, the memory access instruction may in one example implementation be moved into a retry queue not shown in FIG. 3, the retry queue also being connected to the arbiter 170. In due course, the arbiter may then select the memory access instruction from the retry queue in order to attempt to reperform the memory access operation, at which point the process will return to step 305. At this point, it is possible that the memory access instruction may no longer be speculative, and accordingly irrespective of whether there is a hit or a miss, the memory access operation can be processed as normal. Alternatively, it may still be speculative, but there may now be a hit within the cache, allowing the access to proceed as normal. Alternatively, it may be speculative and there may still be a miss, but there may at this point now be a free tracking entry, allowing the processing of the speculative memory access operation to continue.

Figure 6:
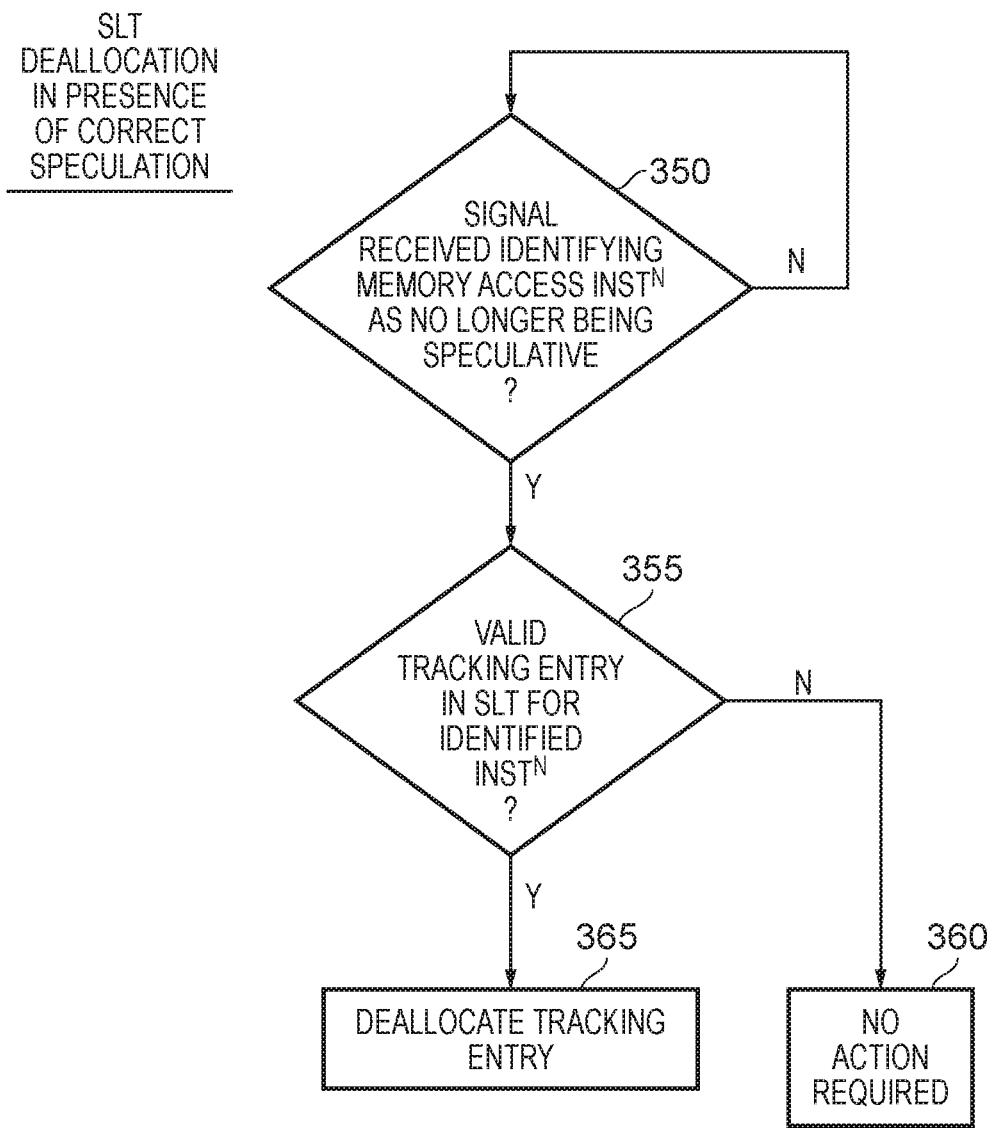
FIG. 6 is a flow diagram illustrating how tracking entries within the speculative allocation tracker may be de-allocated in accordance with one example arrangement.

FIG. 6 is a flow diagram illustrating a scenario that allows an allocated tracking entry in the SLT to be deallocated, in particular in the presence of a correct speculation. Hence, if at step 350 a signal is received identifying a memory access instruction as no longer being speculative, the process may proceed to step 355. The signal received at step 350 may for example come from the reorder buffer, in situations where the SLT is associated with the level one data cache, and hence for example in situations where the SLT is the SLT 185 shown in the LSU 150. However, as will be discussed later, SLTs may also be associated with caches at one or more lower levels in the memory hierarchy, and in such instances the signal received at step 350 may be received from a cache at a higher level in the memory hierarchy. Typically, a memory access instruction will be identified as no longer being speculative when an associated earlier (i.e. an older) branch instruction is resolved and it is determined that the predictions made in respect of that branch instruction by the branch predictor 4 were correct, and that hence the memory access instruction performed speculatively does indeed need to be performed.

When at step 350 a signal is received identifying that the memory access instruction is no longer speculative, then at step 355 a lookup can be performed within the SLT 185 in order to determine whether there is a valid tracking entry in the SLT for the identified instruction. It will be appreciated that this lookup can be performed with reference to the instruction identifier field 205 of each valid tracking entry. If a valid tracking entry is detected at step 355, then the process proceeds to step 365 where that tracking entry is deallocated, by clearing the valid bit in the field 250. However, if no valid tracking entry is identified, then no action is required in respect of the current SLT, as indicated by the step 360.

In one example implementation, when a tracking entry is allocated in association with a speculative memory access instruction (at step 340 of FIG. 5) in order to allow a linefill to be performed into a cache line of the level 1 cache (at step 325 of FIG. 5), the level 1 cache is then constrained so as not to allow the cache line data obtained for that speculative memory access contents to be replaced until there is either a successful branch resolution for any older branch (i.e. the speculation was correct), or it is determined that there has been a branch misprediction (i.e. the speculation was incorrect). Hence, if a valid tracking entry is not detected at step 355, there is no need to propagate the signal received at step 350 on to a lower level of the cache to allow a corresponding lookup to be performed in respect of the SLT associated with that lower level of cache.

Figure 7A:
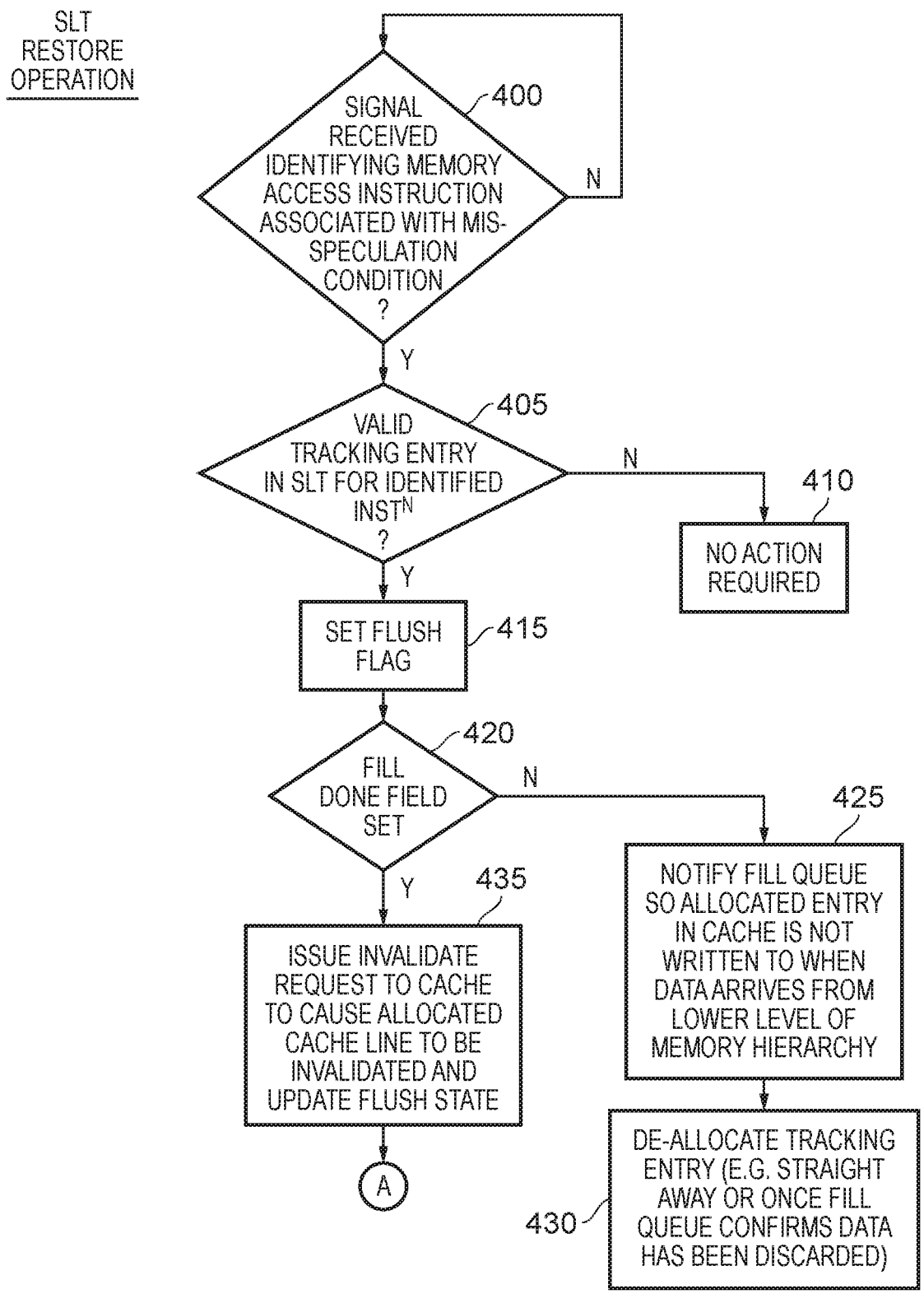
FIGS. 7A and 7B illustrate a restore operation that may be implemented in respect of the cache using the contents of the speculative allocation tracker, in accordance with one example arrangement.
Figure 7B:
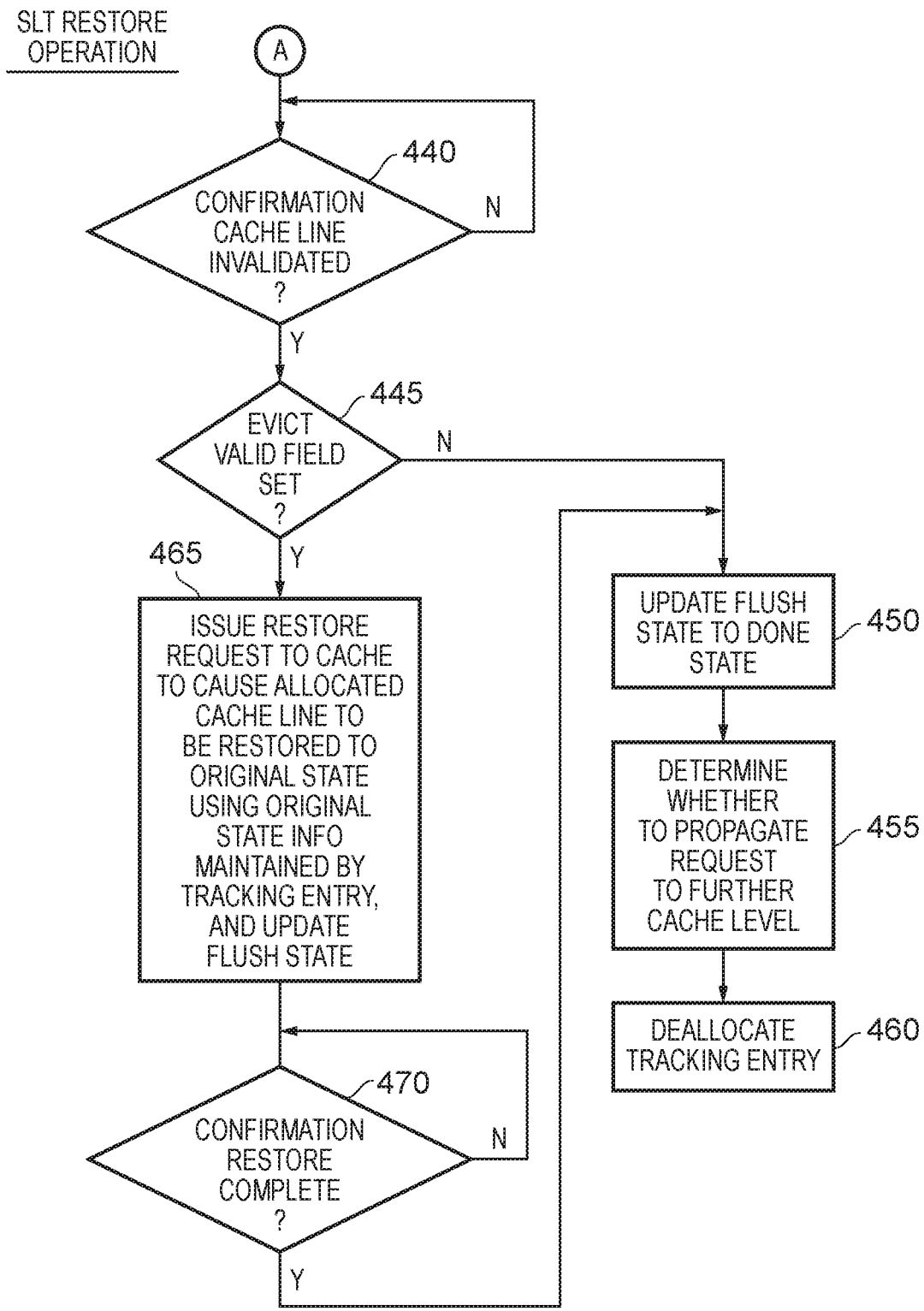

FIGS. 7A and 7B are a flow diagram illustrating a restore operation that may be performed using the contents of the SLT 185, in the presence of a mis-speculation condition. In particular, if at step 400 a signal is received identifying that a memory access instruction is associated with a mis-speculation condition, then the process may proceed to step 405. In one example implementation, this signal will originate from the reorder buffer when a resolution is detected in respect of a branch instruction that identifies a misprediction for that branch, and in particular for each younger memory access instruction that the reorder buffer has identified as being speculative, an indication may be issued to the LSU 150 identifying that memory access instruction.

At step 405, a lookup is performed within the SLT 185 to determine if there is a valid tracking entry for the identified instruction. If not, it is determined that no action is required at step 410.

If a valid tracking entry is detected at step 405, then the flush flag is set for that tracking entry at step 415. This identifies that a restore process needs to be performed in respect of the cache line in the cache 155 that is used to store the data associated with the physical memory address identified by the memory address field 210 of the tracking entry. However, the performance of such a restore process will typically require access to the cache 155, which will need to be arbitrated by the arbiter 170. Further, it is possible that the LSU will receive signals identifying multiple memory access instructions that are affected by a mis-speculated branch, and accordingly the SLT may have multiple tracking entries that need processing. Hence, there may be some delay before the required restore process can be performed in respect of any particular tracking entry, and hence it is useful for the flush flag to be set, so as to identify the affected tracking entries that need processing.

In one example implementation, the arbiter 170 may be arranged to give priority to tracking entries within the SLT having their flush flag set, hence prioritizing such entries over pending load and store operations within the load and store queues 160, 165, respectively. In an alternative implementation, once one or more tracking entries have their flush flag set, the LSU may be able to enter a different mode of operation, such as a restore mode distinct from the normal mode of operation, where the arbiter processes any tracking entries in the SLT having their flush flag set, before returning to the normal mode of operation.

However the restore process is managed within the LSU, it will be appreciated that once the flush flag has been set at step 415 for a tracking entry, then in due course the arbiter 170 will select that tracking entry for processing in respect of the cache. At this point, at step 420 it can be determined if the fill done field is set. If not, then this means that the associated cache line within the cache that has been allocated for the line fill has not yet been written to with the data obtained by the speculative fill request. Hence, the cache itself does not need updating, and instead the process proceeds to step 425 where the fill queue 175 is notified so that the allocated cache line in the cache is not written to when the data arrives from the lower level of the memory hierarchy.

There are a number of ways in which this functionality can be achieved. For example the fill queue entry may have an additional 1-bit field that indicates whether the data is to be discarded when received, or the fill queue may be arranged to check the SLT when the data is received in order to determine if there is a matching tracking entry and, if so, to check the flush status. As another example approach, when step 325 of FIG. 5 is performed to issue a linefill request to a lower level of the memory hierarchy, a fill queue entry will be allocated and the relevant SLT entry can be updated at that point to store an ID for the allocated fill queue entry. Then, at step 425, it is known which fill queue entry needs to be notified. As a further alternative example approach, the fill queue may be notified at step 425 of the physical memory address held in the field 210 of the tracking entry, so that when the data associated with that address is returned, it is merely discarded by the fill queue.

Following step 425, then the tracking entry may be deallocated at step 430 by clearing the valid bit in the field 250. The exact timing of deallocation will vary dependent on implementation. For example, it may be done straightaway following notification to the fill queue at step 425, or alternatively deallocation of the tracking entry may be deferred until a signal has been received back from the fill queue 175 to confirm that the data has been discarded.

If it is determined at step 420 that the fill done field is set, then the process proceeds to step 435 where an invalidate request is issued to the cache, specifying the physical memory address in the field 210, this causing the allocated cache line to be invalidated. The flush state in the field 245 can then be updated accordingly, for example by setting the flush state value to 01 using the example of FIG. 4B to identify that the invalidation has been issued.

Following step 435, the process then proceeds to step 440 in FIG. 7B where confirmation that the cache line has been invalidated is awaited. By this point, if the invalidation of the cache line has caused valid data to be evicted which is more up-to-date than corresponding data stored in a lower level of the cache and/or main memory, then the evicted data will have been captured within the evict buffer 180. As will be discussed in more detail later, this evicted data can be used in situations where the caches in the cache hierarchy operate in an exclusive cache arrangement.

At step 445 it is determined whether the evict valid field 220 is set within the tracking entry 200. If not, the process can proceed to step 450 where the flush state in the field 245 is updated to the done state, i.e. to the value 11 using the example of FIG. 4B. Thereafter, at step 455 it can be determined whether to propagate the request to a further cache level, this process being discussed in more detail later with reference to FIGS. 8A and 8B. Then, at step 460 the tracking entry can be deallocated, by clearing the valid bit in the field 250.

However, if at step 445 it is determined that the evict valid field is set, then this means that it is necessary to restore the original contents into the cache line in order to fully complete the restore operation. Accordingly, at step 465 a restore request is issued to the cache to cause the allocated cache line to be restored to its original state, using the original state information maintained by the tracking entry. Again, the physical address information in the field 210 can be provided along with the restore request, and this can be used to identify the relevant set within the cache. Further, one of the cache lines will have been invalidated due to the performance of the earlier step 435, and accordingly the original state information can be allocated into that invalidated cache line. The restore request will identify the original state information in the field 225, either directly, or with reference to the relevant entry in the evict queue 180 storing that original state information. Accordingly, an update process can be performed in respect of the cache line in order to restore it to its original state.

As also shown by box 465, the flush state can be updated to identify that the restore has been issued, and hence can be updated to the state 10 using the example of FIG. 4B.

Thereafter, at step 470, confirmation is awaited that the restore process has been completed, and thereafter the process proceeds to step 450.

Figure 8A:
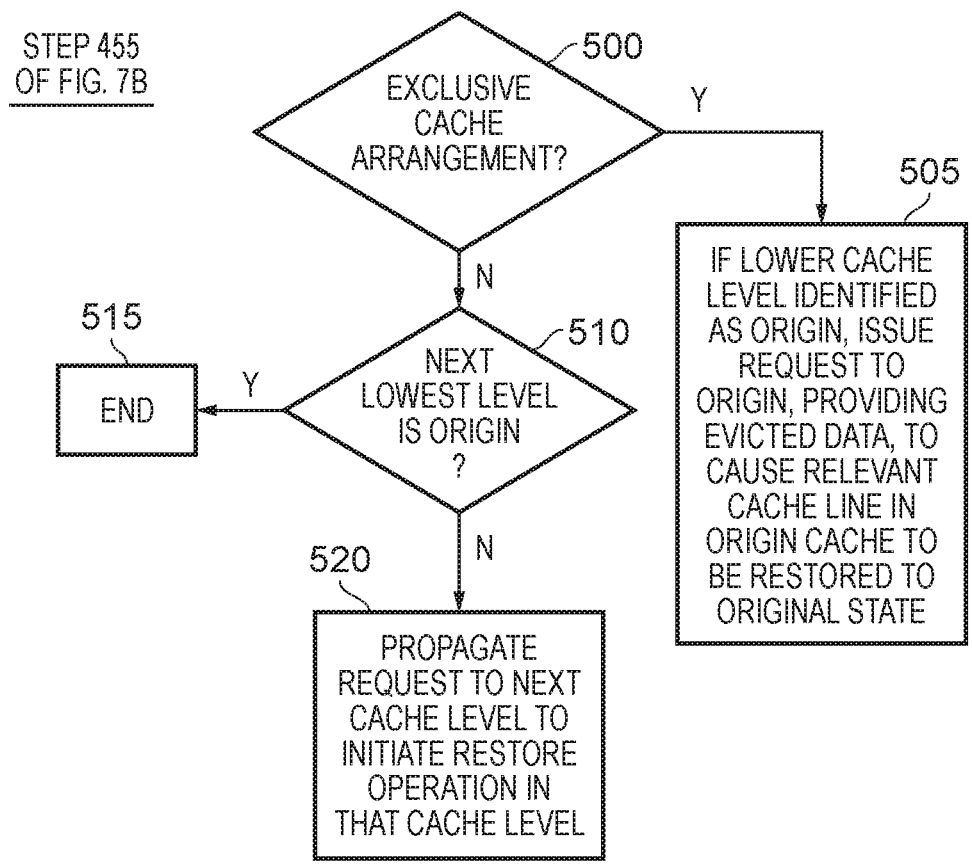
FIG. 8A is a flow diagram illustrating steps performed in order to implement step 455 of FIG. 7B, in accordance with one example arrangement.

FIGS. 8A and 8B illustrate the steps performed in order to implement step 455 of FIG. 7B. The need to propagate on the request will depend on whether the caches in the cache hierarchy are operating in an inclusive arrangement or an exclusive arrangement. In an inclusive arrangement, any data in a cache at a higher cache level will also be stored within a cache at a lower level. However, in accordance with an exclusive arrangement, any data stored in a cache at a particular cache level will not be stored in another cache at a lower cache level.

At step 500 of FIG. 8A it is determined whether the caches are operating in an exclusive cache arrangement. If not, this means that the caches are inclusive caches, and at step 510 it is then determined whether the next lowest level in the cache is the origin level indicated by the information in the origin field 230. If it is, then this means that the data that was the subject of the line fill request will have been provided from that next lowest level of cache, and accordingly no update will be required in order to restore that next lowest level to its original state. Accordingly, the process ends at step 515. However, if the next lowest level is not the origin level, then the process proceeds to step 520 where the request is propagated to the next cache level to initiate the restore operation in that cache level. In particular, in this instance the data will have originated from an even lower level of the cache, and will have caused a line fill allocation into the next lowest level of cache identified at step 510. Accordingly, that allocation will need to be reversed in order to restore that next lowest level of cache to its original state. This can be achieved by propagating the request at step 520 to the next cache level, in order to cause the process of FIGS. 7A and 7B to be performed with reference to the SLT associated with that next cache level.

If at step 500 it is determined that the caches are operating in an exclusive cache arrangement, then the process proceeds to step 505. Here, if a lower cache level is identified as the origin in the origin field 230, as opposed to the main memory being identified as the origin, then a request is issued to that origin level of cache, providing the evicted data resulting from the cache line invalidation performed at steps 435, 440. That evicted data is the data that was originally in the origin cache level, but will have been removed due to the exclusive cache arrangement, and accordingly that evicted data needs to be restored into that origin cache level in order to restore that origin cache level to its original state. Hence the evicted data will contain both the data from the evicted cache line and the associated address information so as to enable that data to be restored into the origin cache level.

It should be noted that when the caches are operating in an exclusive arrangement, no intervening actions are required in respect of any intervening cache levels between the level one cache and the origin cache level, since the exclusive arrangement will have ensured that the data is not stored in any of those intervening cache levels.

FIG. 8B is a table summarizing the actions performed when implementing the process of FIG. 8A, dependent on whether the caches operate in an inclusive or exclusive arrangement, and dependent on the origin level of the information allocated into the level one cache by virtue of the speculative fill request. Here it is assumed that there are three levels of cache. It will be noted that in all instances the invalidate and restore process is performed in respect of the level one cache. However, when using an inclusive cache arrangement, the extent to which the invalidate and restore process needs to be performed at any lower levels of cache will depend on the origin information captured in the origin field 230. Further, when using the exclusive cache arrangement, the invalidate and restore operation in respect of the original speculatively allocated data only needs to be performed in respect of the level one cache, but where the origin was also a cache level, a write back operation needs to be performed in respect of that cache level in order to repopulate that cache level with the information evicted from the level one cache during the invalidate and restore operation.

Figure 9:
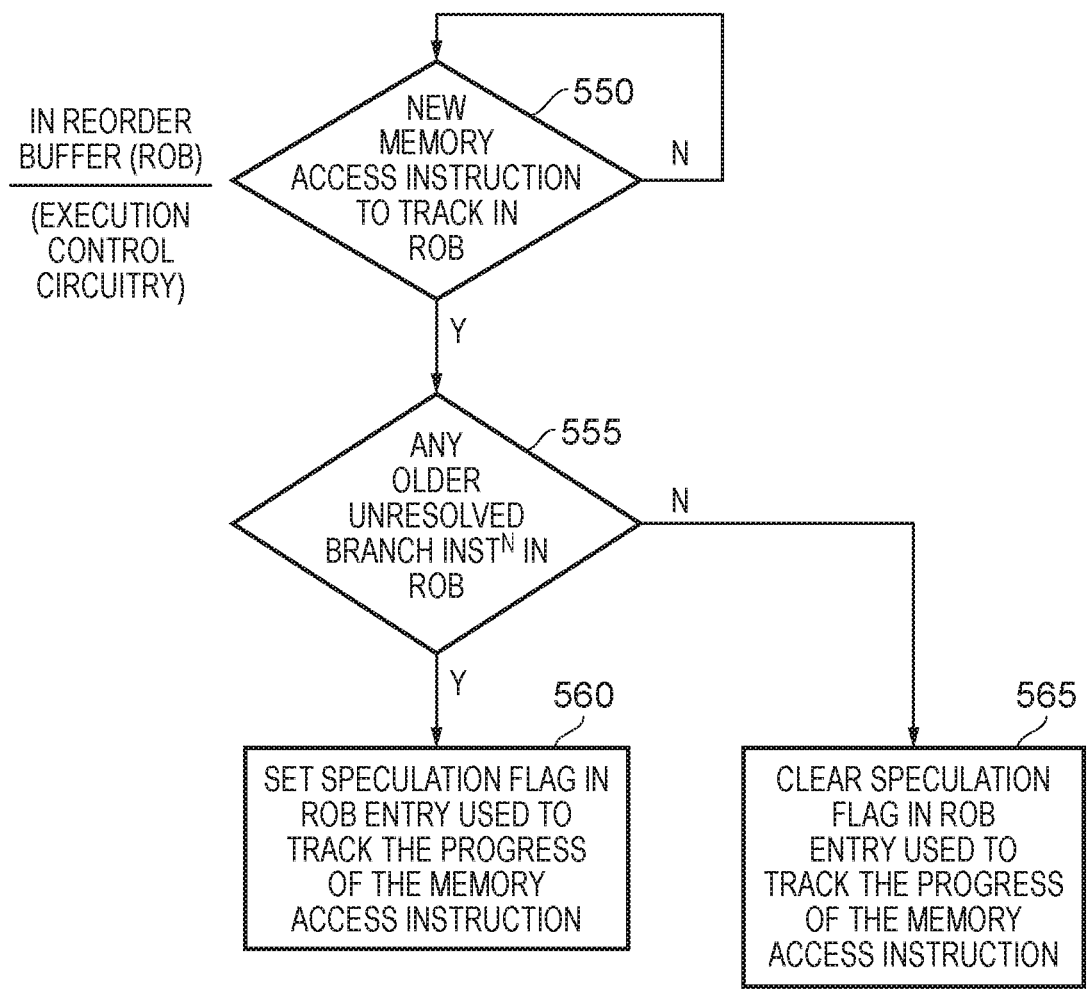
FIG. 9 is a flow diagram illustrating the tracking of memory access instructions within a reorder buffer in accordance with one example arrangement.
Figure 10:
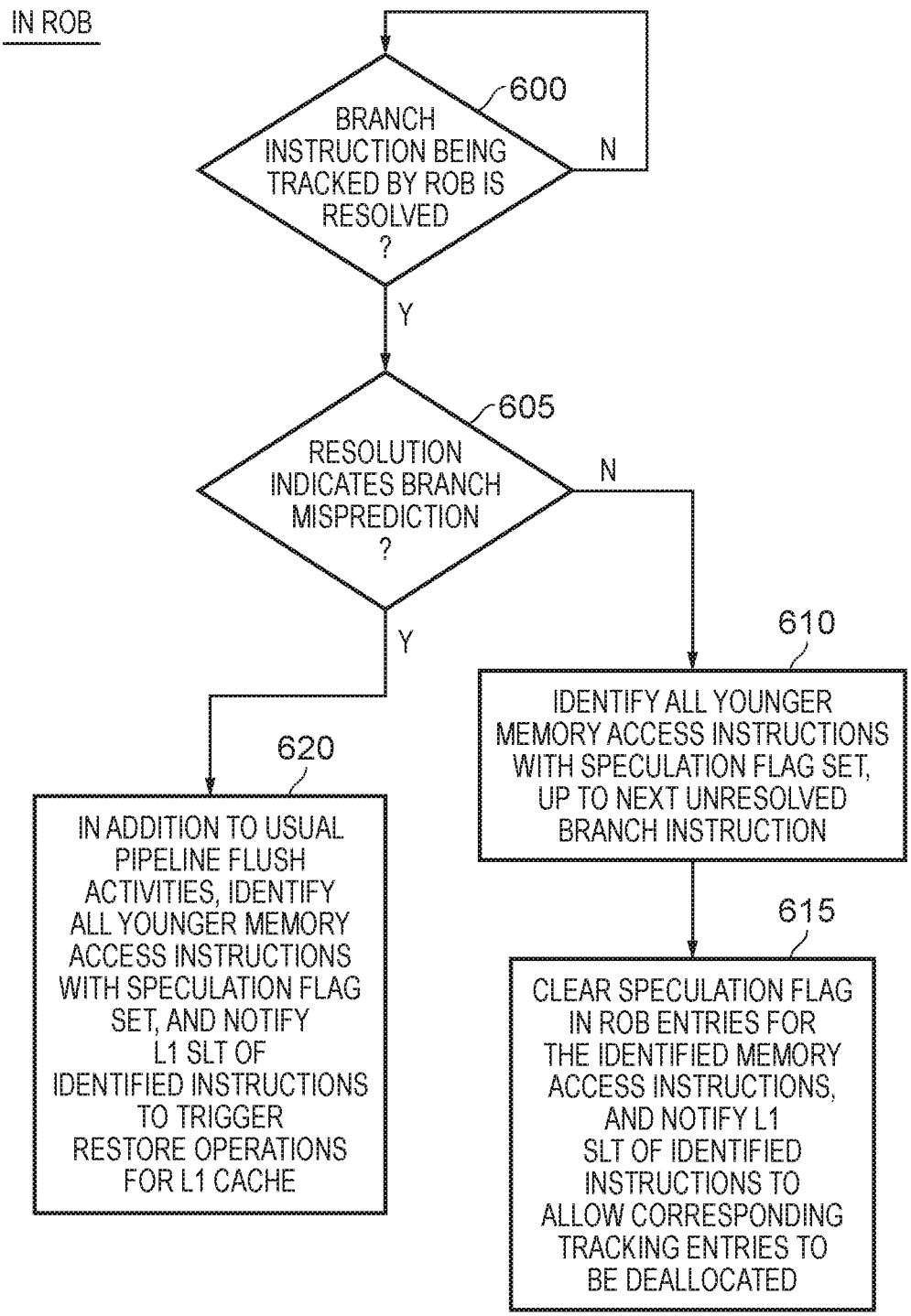
FIG. 10 is a flow diagram illustrating steps that may be performed within the reorder buffer when a branch instruction is resolved, in accordance with one example arrangement.

FIG. 9 is a flow diagram illustrating how execution control circuitry such as the reorder buffer can keep track of memory access instructions that are being performed speculatively. At step 550, it is determined whether there is a new memory access instruction to be tracked within the reorder buffer. When this is the case, then the process proceeds to step 555 where it is determined whether there are any older unresolved branch instructions in the reorder buffer. If so, then a speculation flag is set at step 560 in the reorder buffer entry used to track the progress of the memory access instruction. Otherwise, the speculation flag in the reorder buffer entry used to track the progress of the memory access instruction is cleared at step 565. By using the speculation flag, the reorder buffer can quickly determine which memory access instructions are affected when any particular branch instruction is resolved, and this information can then be used to send appropriate signals to the load store unit, to cause the SLT entries to be updated as needed. This process will be discussed in more detail with reference to the flow diagram of FIG. 10.

In particular, at step 600 it is determined whether a branch instruction being tracked by the reorder buffer is resolved. When this is the case, the process proceeds to step 605 where it is determined whether that resolution indicates that there has been a branch misprediction. If not, then at step 610 all younger memory access instructions whose speculation flag is set, up to the next unresolved branch instruction (i.e. the next younger unresolved branch instruction than the branch instruction that has been resolved) are identified by the reorder buffer.

For the younger memory access instructions identified at step 610, then their speculation flags can be cleared in the relevant reorder buffer entries at step 615, and further the SLT associated with the level one cache can be notified of those identified instructions in order to allow the corresponding tracking entries to be deallocated, using the process discussed earlier with reference to FIG. 6. In particular, it is known for these younger memory access instructions there will be no corrective action needed in respect of the cache, and any speculatively allocated data into the cache based on those speculative memory access instructions can be retained.

However, if at step 605 it is determined that the resolution indicates a branch misprediction, then at step 620, in addition to performing all the usual pipeline flush activities associated with a branch misprediction, the reorder buffer identifies all younger memory access instructions that have their speculation flag set. The reorder buffer then notifies the SLT associated with the level one cache of those identified instructions, in order to trigger restore operations within the level one cache, using the process discussed earlier with reference to FIGS. 7A and 7B. As will be apparent from the earlier discussion, requests can then be propagated on as necessary to lower levels of cache in order to cause any required restore operations to be performed in those lower levels of cache. Once the contents of the reorder buffer have been used to identify the younger memory access instructions with the speculation flag set, then the relevant entries in the reorder buffer can be flushed, i.e. the entries associated with instructions that are no longer going to be executed.

Once a misprediction has been detected in respect of a branch, then all younger instructions will be flushed from the pipeline, and the process will be replayed starting with the correct branch outcome. However, it should be noted that due to the out-of-order execution, there could be older branches and older memory access instructions (i.e. older than the mispredicted branch) that are still being tracked by the reorder buffer, and the SLT may still have valid tracking entries for those older memory access instructions. In particular, those tracking entries associated with older memory access instructions still need to be retained until the branch outcome is known for any earlier branch instruction.

Figure 11:
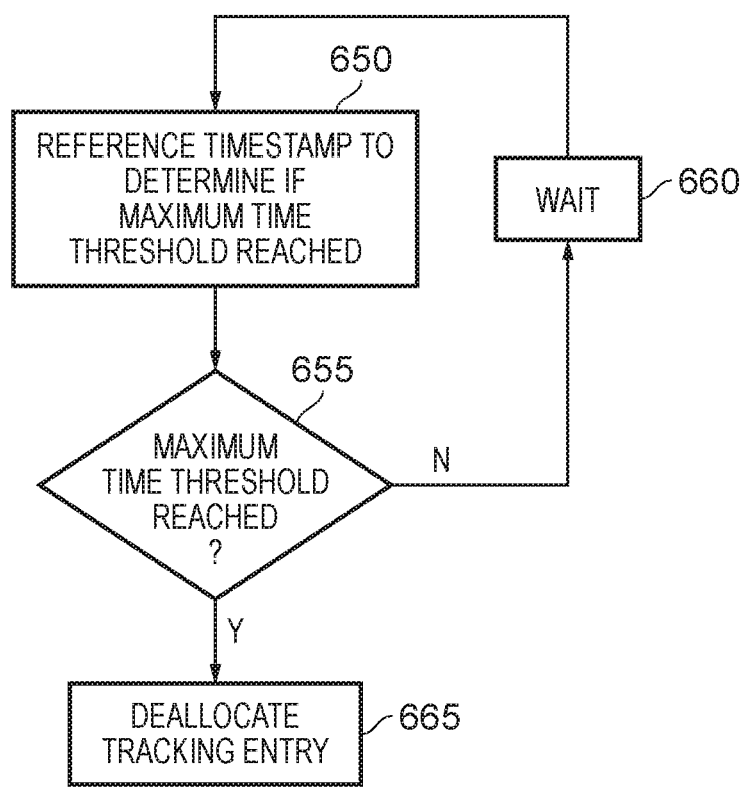
FIG. 11 is a flow diagram illustrating how a time stamp field within the tracking entries of the speculative allocation tracker may be used to implement deadlock avoidance in accordance with one example implementation.

FIG. 11 is a flow diagram illustrating a deadlock avoidance scheme that may be implemented, when employing the time stamp field 235 within each tracking entry 200 as discussed earlier with reference to FIG. 4B. The time stamp information captured within the field 235 can take a variety of forms. However, in one example implementation it is not stored at the granularity of single clock cycles. Instead, for the deadlock avoidance scheme, blocks of a thousand cycles may for example be considered. Hence, if an SLT entry is allocated at cycle 10002, the time stamp value captured may be 10 to identify that ten one thousand cycle blocks have elapsed. The process of FIG. 11 could then be implemented periodically, for example every one thousand cycles, at which point the entire SLT could be checked, and in particular the time stamp information can be checked in respect of each valid tracking entry in the SLT.

Hence, for each valid entry, at step 650 the time stamp information can be referenced to determine if a maximum time threshold has been reached. In particular, a comparison time stamp value might be generated from the current cycle count, for example to capture the number of a thousand cycle blocks that have elapsed, and the time stamp value stored in the field 235 can be subtracted from that comparison time stamp value in order to determine whether the result exceeds some predetermined threshold.

If at step 655 it is determined that the maximum time threshold has been reached, then the tracking entry may be deallocated at step 665. The fact that the maximum time threshold has been reached may indicate a scenario where a tracking entry has not been deallocated as expected, and accordingly it may be considered appropriate to deallocate the tracking entry at that point in order to avoid a deadline scenario potentially arising. In particular, it should be noted that the maximum time threshold should not be reached if the SLT is operating correctly, since the threshold will have been chosen to exceed the maximum time it is expected that a tracking entry will need to be allocated, taking into account the degree of speculation supported by the system. Hence, in situations where the maximum time threshold has been exceeded, this signifies a scenario where the tracking entry has not been deallocated correctly, instead of identifying a scenario where the tracking entry is still correctly tracking a speculative memory access operation. Accordingly, it is safe to deallocate the tracking entry in order to seek to alleviate the risk of deadlock avoidance.

If at step 655 it is determined that the maximum time threshold has not been reached, then the process waits at step 660, before performing the process in respect of the relevant tracking entry. For example, as discussed earlier, the process of FIG. 11 may be performed periodically, for example every one thousand cycles.

The threshold value that is compared against in order to determine whether the maximum time threshold has been reached can in one implementation be programmable, for example by being written into a register accessible to the cache control circuitry when performing the process of FIG. 11 in respect of the SLT entries. This enables configurability as to the maximum length of time a tracking entry is expected to be validly allocated during correct operation of the system.

It will be appreciated that, when employing the above described techniques, a mechanism can be provided for protecting against speculation-based cache timing side-channel attacks, whilst alleviating the performance and/or power consumption issues associated with previously proposed techniques.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions, the processing circuitry being arranged to allow speculative execution of one or more of the instructions;
a cache storage at a given level in a memory hierarchy, the cache storage comprising a plurality of entries to store information for reference by the processing circuitry;
cache control circuitry to control use of the cache storage, the cache control circuitry comprising a speculative allocation tracker having a plurality of tracking entries;
at least one additional cache storage at a different level in the memory hierarchy; and
a further speculative allocation tracker for each additional cache storage;
wherein:
the cache control circuitry is responsive to a speculative request associated with the speculative execution, requiring identified information to be allocated into a given entry of the cache storage, to allocate a tracking entry in the speculative allocation tracker for the speculative request before allowing the identified information to be allocated into the given entry of the cache storage, and to employ the allocated tracking entry to maintain restore information sufficient to enable the given entry to be restored to an original state that existed prior to the identified information being allocated into the given entry;
the cache control circuitry is further responsive to a mis-speculation condition being detected in respect of the speculative request, to employ the restore information maintained in the allocated tracking entry for that speculative request in order to restore the given entry in the cache storage to the original state;
in response to the mis-speculation condition being detected in respect of the speculative request, the further speculative allocation tracker associated with each additional cache storage that has had an entry updated due to the speculative request is arranged to perform a restore operation in order to restore that entry to its original state; and
the allocated tracking entry has an origin field to identify the level within the memory hierarchy from which the identified information was obtained.

2. An apparatus as claimed in claim 1, wherein in the absence of a tracking entry being available for allocation in association with the speculative request, the speculative request is stalled.

3. An apparatus as claimed in claim 1, wherein once the given entry has been restored to the original state in response to the mis-speculation condition, the cache control circuitry is arranged to deallocate the allocated tracking entry.

4. An apparatus as claimed in claim 1, wherein a number of steps required to be performed in order to implement a restore operation to restore the given entry to the original state is dependent on the restore information, and the allocated tracking entry has a restore status field to track performance of the steps required to implement the restore operation.

5. An apparatus as claimed in claim 1, wherein the cache storage is at a given level in a memory hierarchy, the speculative request requires issuing to a lower level of the memory hierarchy in order to obtain the identified information, and the cache control circuitry is arranged to prevent issuance of the speculative request to the lower level of the memory hierarchy until a tracking entry has been allocated in the speculative allocation tracker for the speculative request.

6. An apparatus as claimed in claim 5, wherein:
when the mis-speculation condition is detected before the identified information has been obtained, the cache control circuitry is arranged to prevent the identified information being written into the given entry to thereby preserve the original state of the given entry.

7. An apparatus as claimed in claim 6, wherein:
the cache control circuitry comprises a fill buffer to temporarily store information received from the lower level of the memory hierarchy before storing that information in the cache storage; and
when the mis-speculation condition is detected before the identified information has been obtained, the cache control circuitry is arranged to prevent the identified information being written into the given entry by notifying the fill buffer to discard the identified information when received from the lower level of the memory hierarchy.

8. An apparatus as claimed in claim 6, wherein once writing of the identified information into the given entry has been prevented, the cache control circuitry is arranged to deallocate the allocated tracking entry.

9. An apparatus as claimed in claim 1, wherein responsive to a correct speculation condition being detected in respect of the speculative request, the cache control circuitry is arranged to deallocate the allocated tracking entry.

10. An apparatus as claimed in claim 1, wherein the allocated tracking entry has a fill complete field which is set to identify when the identified information has been stored in the given entry of the cache storage.

11. An apparatus as claimed in claim 1, wherein the allocated tracking entry has an evict valid field which is set to identify when allocation of the identified information into the given entry causes an eviction of existing information from the given entry.

12. An apparatus as claimed in claim 1, wherein the origin information is used to determine which further speculative allocation trackers are required to perform the restore operation.

13. An apparatus as claimed in claim 1, wherein the cache storage is a data cache, and the information comprises data values processed by the processing circuitry when executing the instructions.

14. An apparatus as claimed in claim 13, wherein the speculative request results from speculative execution of a memory access instruction that gives rise to a miss being detected in the cache storage.

15. An apparatus as claimed in claim 14, further comprising:
execution control circuitry to track progress of instructions being executed by the processing circuitry, and to flag the memory access instruction as being speculative whilst an older branch instruction is being tracked in the execution control circuitry as an unresolved branch;
wherein the execution control circuitry is arranged to detect the mis-speculation condition when branch resolution identifies that a misprediction was made for the older branch instruction, and to trigger performance of a restore operation by the cache control circuitry for the flagged memory access instruction.

16. An apparatus as claimed in claim 15, wherein:
the execution control circuitry is arranged to trigger performance of the restore operation by issuing instruction identifier information to the cache control circuitry to identify each flagged memory access instruction younger than the older branch instruction; and
each tracking entry includes an instruction identifier field, and the cache control circuitry causes a lookup to be performed in the speculative allocation tracker using the instruction identifier information received from the execution control circuitry in order to identify each entry in the cache storage that needs to be restored to its original state.

17. An apparatus as claimed in claim 1, wherein each tracking entry includes a timestamp field that is set to a timestamp value when that tracking entry is allocated, and which is referenced to determine elapse of a time period after which the allocated tracking entry is to be deallocated to prevent a deadlock condition.

18. An apparatus as claimed in claim 1, wherein the cache storage is an instruction cache, and the information comprises instructions fetched from memory for execution by the processing circuitry.

19. An apparatus as claimed in claim 1, wherein the cache storage comprises an address translation cache, and the information comprises address translation data used by the processing circuitry when converting a virtual address into a corresponding physical address of a memory system.

20. An apparatus as claimed in claim 1, wherein:
when allocation of the identified information into the given entry causes an eviction of existing information from the given entry, the restore information is arranged to comprise at least the existing information.

21. An apparatus as claimed in claim 20, wherein:
the cache control circuitry comprises an eviction buffer into which information evicted from entries of the cache storage is temporarily stored; and
when allocation of the identified information into the given entry causes an eviction of the existing information from the given entry, the existing information is captured in a given buffer entry of the eviction buffer, and the speculative allocation tracker is arranged to maintain the restore information with reference to the given buffer entry.

22. An apparatus as claimed in claim 21, wherein the given buffer entry forms part of the allocated tracking entry.

23. A method of controlling allocation of information into a cache storage at a given level in a memory hierarchy, comprising:
providing processing circuitry to execute instructions, the processing circuitry being arranged to allow speculative execution of one or more of the instructions;
arranging the cache storage to provide a plurality of entries to store information for reference by the processing circuitry;
providing a speculative allocation tracker having a plurality of tracking entries;
providing at least one additional cache at a different level in the memory hierarchy;
providing a further speculative allocation tracker for each additional cache storage;
in response to a speculative request associated with the speculative execution, that requires identified information to be allocated into a given entry of the cache storage, -allocating a tracking entry in the speculative allocation tracker for the speculative request before allowing the identified information to be allocated into the given entry of the cache storage;
employing the allocated tracking entry to maintain restore information sufficient to enable the given entry to be restored to an original state that existed prior to the identified information being allocated into the given entry; and
responsive to a mis-speculation condition being detected in respect of the speculative request, employing the restore information maintained in the allocated tracking entry for that speculative request to restore the given entry in the cache storage to the original state; and
in response to the mis-speculation condition being detected in respect of the speculative request, performing, by the further speculative allocation tracker associated with each additional cache storage that has had an entry updated due to the speculative request, a restore operation in order to restore that entry to its original state;
wherein the allocated tracking entry has an origin field to identify the level within the memory hierarchy from which the identified information was obtained.

* * * * *